US006819733B2

(12) United States Patent
Broders et al.

(10) Patent No.: US 6,819,733 B2
(45) Date of Patent: Nov. 16, 2004

(54) FUEL ASSEMBLY AND ASSOCIATED GRID FOR NUCLEAR REACTOR

(75) Inventors: Richard P. Broders, Granby, CT (US); Stephen C. Hatfield, Hartford, CT (US); Michael L. Martin, Simsbury, CT (US); Paul F. Joffre, Colchester, CT (US); Zeses E. Karoutas, Simsbury, CT (US); Patrick A. Perrotti, Newington, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 10/147,215

(22) Filed: May 15, 2002

(65) Prior Publication Data

US 2003/0215048 A1 Nov. 20, 2003

(51) Int. Cl.[7] ................................................. G21C 3/34
(52) U.S. Cl. ...................... 376/442; 376/439; 376/434; 376/438
(58) Field of Search ................................ 376/442, 439, 376/434, 438, 441

(56) References Cited

U.S. PATENT DOCUMENTS

| | | | | |
|---|---|---|---|---|
| 3,801,452 A | * | 4/1974 | Milburn ....................... 376/442 |
| 3,862,000 A | | 1/1975 | Pugh et al. |
| 4,028,180 A | * | 6/1977 | Finch .......................... 376/442 |
| RE30,247 E | * | 4/1980 | Andrews et al. ............... 176/78 |
| 4,268,356 A | | 5/1981 | Kmonk et al. |
| 4,426,355 A | * | 1/1984 | Burger ........................ 376/442 |
| 4,474,730 A | | 10/1984 | Hellman et al. |
| 4,521,374 A | | 6/1985 | Duncan |
| 4,576,786 A | | 3/1986 | DeMario |
| 4,578,240 A | | 3/1986 | Cadwell |
| 4,585,615 A | | 4/1986 | DeMario |
| 4,585,616 A | | 4/1986 | DeMario et al. |
| 4,594,216 A | * | 6/1986 | Feutrel ........................ 376/442 |
| 4,659,541 A | | 4/1987 | Rylatt |
| 4,659,542 A | | 4/1987 | Kerrey |
| 4,678,632 A | | 7/1987 | Ferrari |
| 4,702,881 A | | 10/1987 | Weiland et al. |
| 4,744,942 A | * | 5/1988 | Ferrari et al. ................ 376/442 |
| 4,758,403 A | | 7/1988 | Noailly |
| 4,803,043 A | | 2/1989 | DeMario et al. |
| 4,844,861 A | * | 7/1989 | Leclercq ...................... 376/439 |
| 4,873,051 A | | 10/1989 | Duncan et al. |
| 4,885,127 A | | 12/1989 | Yokoyama |
| 4,895,698 A | | 1/1990 | DeMario |
| 4,923,669 A | | 5/1990 | DeMario |
| 4,957,697 A | | 9/1990 | Wada |
| 5,331,678 A | * | 7/1994 | Hatfield et al. .............. 376/442 |
| 5,440,599 A | | 8/1995 | Rodack et al. |
| 5,444,748 A | | 8/1995 | Beuchel et al. |
| 5,515,408 A | | 5/1996 | Oyama et al. |
| 6,310,932 B1 | * | 10/2001 | Evans et al. ................. 376/442 |
| 6,393,087 B1 | * | 5/2002 | Oh et al. ..................... 376/439 |

FOREIGN PATENT DOCUMENTS

| FR | 0 084 481 | * | 7/1983 |
| FR | WO 99/03108 | * | 1/1999 |

OTHER PUBLICATIONS

Merriam–Webster's Collegiate Dictionay, 10th Edition, 1993, p. 1106.*

* cited by examiner

*Primary Examiner*—Jack Keith
*Assistant Examiner*—R Palabrica

(57) ABSTRACT

An improved grid for use in a fuel assembly of a nuclear reactor includes a plurality of straps that are interconnected with one another in a lattice fashion to define a plurality of cells, with the straps being configured to include a plurality of relatively more compliant springs and a plurality of relatively less compliant dimples, whereby each cell includes only one pair of springs and one pair of dimples disposed therein. The springs and dimples are contoured to engage a fuel rod or a thimble tube disposed within the cell. Each spring directly confronts one of the dimples to provide confronting pairs of features that engage the fuel rods or thimble tubes, with each cell including two pairs of confronting features. The ligaments of the springs and dimples extend in a direction generally perpendicular to the direction of coolant flow through the reactor in order to minimize pressure drop.

13 Claims, 6 Drawing Sheets

FUEL ASSEMBLY AND ASSOCIATED GRID FOR NUCLEAR REACTOR

BACKGROUND OF THE INVENTION

1. Field of the Invention

The present invention relates generally to nuclear reactors and, more particularly, to an improved grid and resulting fuel assembly for a pressurized water nuclear reactor.

2. Description of the Related Art

In most pressurized water nuclear reactors, the reactor core is comprised of a large number of elongated fuel assemblies. These fuel assemblies typically include a plurality of fuel rods held in an organized array by a plurality of grids that are spaced axially along the fuel assembly length and are attached to a plurality of elongated thimble tubes of the fuel assembly. The thimble tubes typically receive control rods or instrumentation therein. Top and bottom nozzles on opposite ends of the fuel assembly are secured to the ends of the thimble tubes that extend slightly above and below the ends of the fuel rods.

The grids, as is known in the relevant art, are used to precisely maintain the spacing between the fuel rods in the reactor core, resist rod vibration, provide lateral support for the fuel rods and, to some extent, vertically restrain the rods against longitudinal movement. One type of conventional grid design includes a plurality of interleaved straps that together form an egg-crate configuration having a plurality of roughly square cells which individually accept the fuel rods therein. Depending upon the configuration of the thimble tubes, the thimble tubes can either be received in cells that are sized the same as those that receive the fuel rods therein, or can be received in relatively larger thimble cells defined in the interleaved straps.

The straps of previously known grids have been configured such that the cells each include a pair of relatively compliant springs and four or more relatively rigid dimples, with the springs and dimples being formed into the metal of the interleaved straps and protruding outwardly therefrom. The springs and dimples of each cell engage the respective fuel rod or thimble tube extending through the cell. Outer straps of the grid are attached together and peripherally enclose the inner straps of the grid to impart strength and rigidity to the grid.

Depending upon the specific configuration of the grid and the straps, the straps may each include one or more mixing vanes formed thereon that facilitate mixing of the water within the reactor and thus promote convective heat exchange between the fuel rods and the water. Since the reactor is designed such that the water moves generally vertically upward through each fuel assembly, the mixing vanes, while promoting mixing of the water, nevertheless impart forces and torques to the grid as a result of the water impinging on the vanes. Such forces and torques on the grid can result in stresses and vibrations being applied by the grid to the fuel rods.

It is also known in the relevant art that during operation of the reactor the elevated temperatures, pressures, and fluid velocities within the reactor tend to cause vibrations between the grids and the fuel rods. Since the grids support the fuel rods within the fuel cell, such vibrations therebetween can result in fretting of the fuel rods. Such fretting, if sufficiently severe, can result in corruption of the fuel rod with resultant nuclear contamination of the water within the reactor. It is thus desired to provide an improved grid having springs and dimples that are designed to minimize fretting wear between the grids and the fuel rods.

As is known in the relevant art, the straps of such grids typically are made of known materials such as Zircaloy or other such materials which are suited to the nuclear environment within a nuclear reactor. It is known, however, that Zircaloy tends to grow after prolonged periods of exposure to a nuclear environment, and such growth is even greater in regions of the straps that are work hardened due to metal forming operations. Such growth hampers the dimensional stability of the fuel assembly, and it is thus desired that any such improved grid likewise promote and maintain the dimensional stability of the fuel assembly. It is further desired that such an improved grid have enhanced thermal-hydraulic performance and reduced fabrication costs.

SUMMARY OF THE INVENTION

In view of the foregoing, an improved grid for use in a fuel assembly of a nuclear reactor includes a plurality of straps that are interconnected with one another in a lattice fashion to define a plurality of cells, with the straps being configured to include a plurality of relatively more compliant springs and a plurality of relatively less compliant dimples, whereby each cell includes only one pair of springs and one pair of dimples disposed therein. The springs and dimples are contoured to engage a fuel rod or a thimble tube disposed within the cell. Each spring directly confronts one of the dimples to provide confronting pairs of features that engage the fuel rods or thimble tubes, with each cell including two pairs of confronting features. The ligaments of the springs and dimples extend in a direction generally perpendicular to the direction of coolant flow through the reactor in order to minimize pressure drop.

Accordingly, an aspect of the present invention is to provide an improved grid for a fuel assembly of a nuclear reactor in which the grid is configured to reduce fretting wear between the grid and the fuel rods.

Another aspect of the present invention is to provide such a grid having springs and dimples that are formed to include a contour that corresponds with the fuel rods.

Another aspect of the present invention is to provide such a grid having springs and dimples that are configured to reduce the pressure drop of coolant passing through the nuclear reactor.

Another aspect of the present invention is to provide such a grid having straps that are formed to include a plurality of springs and dimples, with the springs and dimples each being of substantially the same height and width, whereby each spring directly confronts only a single dimple to provide pairs of directly confronting support features for supporting fuel rods within cells of the grid.

Another aspect of the present invention is to provide such a grid that provides improved thermal-hydraulic performance.

Another aspect of the present invention is to provide such a grid that can be fabricated at a reduced cost.

Another aspect of the present invention is to provide such a grid that promotes dimensional stability of a fuel assembly into which the grid is incorporated.

Another aspect of the present invention is to provide an improved fuel assembly that incorporates an improved grid incorporating one or more of the features set forth above.

Accordingly, an aspect of the present invention is to provide a grid for use in a fuel assembly of a nuclear reactor, the grid being structured to carry a plurality of cylindrical members including at least one of a fuel rod and a thimble tube, each of the cylindrical members including an outer surface, in which the general nature of the grid can be stated as including a plurality of straps, the straps being interconnected with one another in a lattice fashion to define a plurality of cells, each strap including a plurality of strap members, each strap member defining a wall of at least one of the cells, each strap member including a protruding spring and a protruding dimple, the spring including a spring plate formed to include a spring contour, and the dimple including a dimple plate formed to include a dimple contour, the spring contour and the dimple contour each being structured to substantially correspond with and engage at least a portion of the outer surface of an associated cylindrical member, and a pair of the springs and a pair of the dimples extending into each of the cells, one of the pair of the springs and one of the pair of the dimples directly confronting one another, the other of the pair of the springs and the other of the pair of the dimples directly confronting one another.

Another aspect of the present invention is to provide a grid for use in a fuel assembly of a nuclear reactor, the grid being structured to carry a plurality of cylindrical members including at least one of a fuel rod and a thimble tube, each of the cylindrical members including an outer surface, in which the general nature of the grid can be stated as including a plurality of straps, the straps being interconnected with one another in a lattice fashion to define a plurality of cells, each strap including a strap axis and a plurality of strap members, the strap axes together lying generally within an imaginary grid plane, each strap member including a frame, a spring, and a dimple, the spring and the dimple protruding from the frame, the spring including a spring plate and a pair of spring ligaments, and the dimple including a dimple plate and a pair of dimple ligaments, the spring being structured to engage at least a portion of the outer surface of an associated cylindrical member, the dimple being structured to engage at least a portion of the outer surface of an associated cylindrical member, each spring ligament including a spring ligament axis extending between the frame and the spring plate, and each dimple ligament including a dimple ligament axis extending between the frame and the dimple plate, the spring ligament axes and the dimple ligament axes all being oriented generally parallel with the grid plane, and a pair of the springs and a pair of the dimples extending into each of the cells, one of the pair of the springs and one of the pair of the dimples directly confronting one another, the other of the pair of the springs and the other of the pair of the dimples directly confronting one another.

Another aspect of the present invention is to provide a fuel assembly for use in a nuclear reactor, the general nature of which can be stated as including a plurality of cylindrical members including at least one of a fuel rod and a thimble tube, and at least a first grid, the at least first grid including a plurality of straps interconnected with one another in a lattice fashion to define a plurality of cells, the cylindrical members being disposed in the cells, each strap including a plurality of strap members, each strap member including a protruding spring and a protruding dimple, the spring including a spring plate and a pair of spring ligaments, and the dimple including a dimple plate and a pair of dimple ligaments, the spring ligaments and the dimple ligaments all extending in a direction generally transverse to the longitudinal extent of the cylindrical members, and wherein a pair of the springs and a pair of the dimples extend into each of the cells, one of the pair of the springs and one of the pair of the dimples directly confronting one another, the other of the pair of the springs and the other of the pair of the dimples directly confronting one another.

Another aspect of the present invention is to provide a grid for use in a fuel assembly of a nuclear reactor, the grid being structured to carry a plurality of cylindrical members including at least one of a fuel rod and a thimble tube, in which the general nature of the grid can be stated as including a plurality of straps, the straps being interconnected with one another in a lattice fashion to define a plurality of cells, each strap including an upstream edge, each strap including a downstream edge, the upstream edge and the downstream edge being disposed generally opposite one another, each strap including a plurality of strap members, each strap member defining a wall of at least one of the cells, each strap member including a protruding spring, each strap member including a protruding dimple, the spring and the dimple being disposed at alternate sides of at least a portion of a single groove formed in the associated strap member, the groove being disposed generally midway between the upstream and downstream edges.

BRIEF DESCRIPTION OF THE DRAWINGS

A further understanding of the invention can be gained from the following description of the preferred embodiments when read in conjunction with the accompanying drawings in which.

Similar numerals refer to similar parts throughout the specification.

DESCRIPTION OF THE PREFERRED EMBODIMENT

Figure 1:
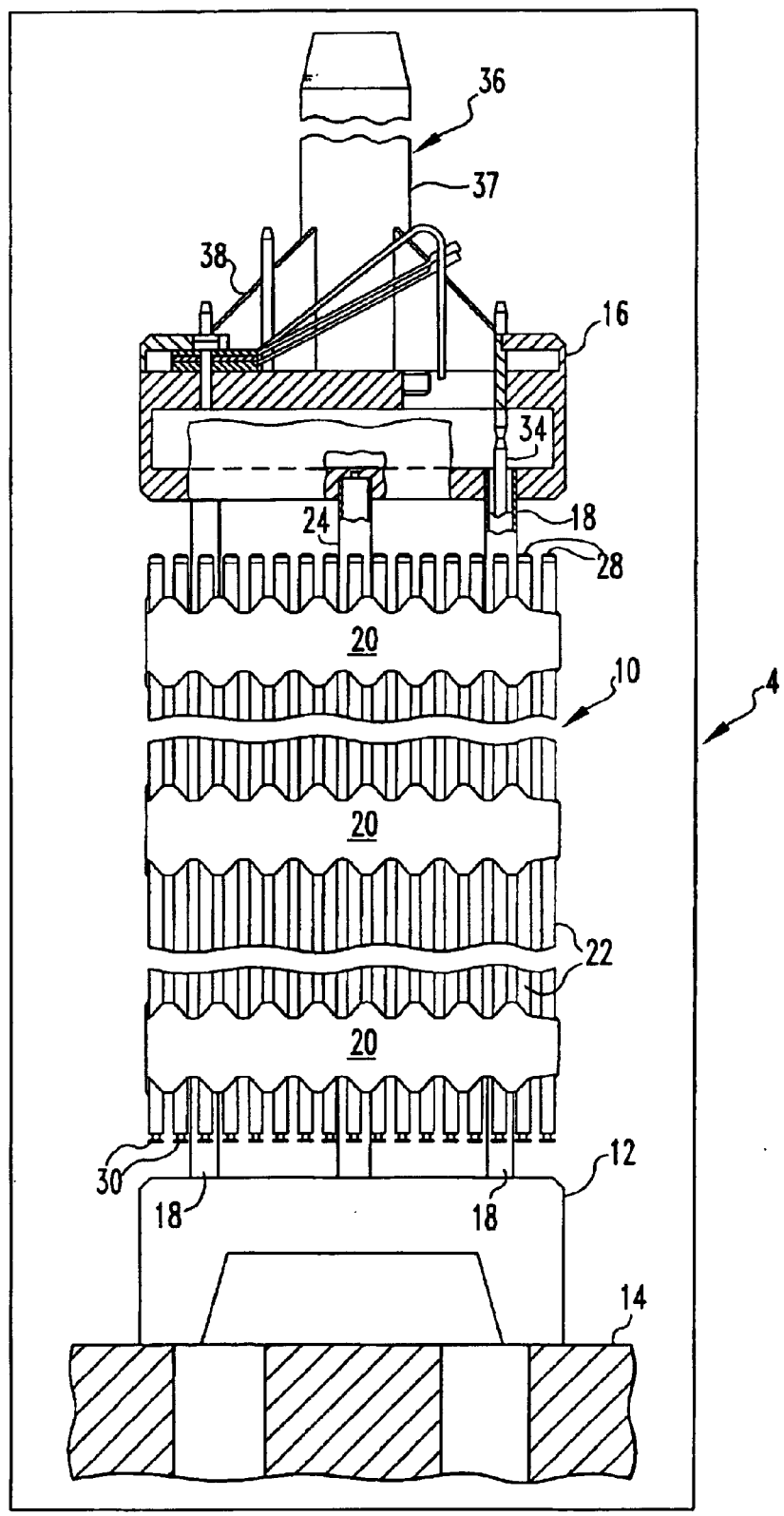
FIG. 1 is a schematic elevational view of a nuclear reactor including a schematically depicted and foreshortened fuel assembly, partially in section, in accordance with the present invention.

An exemplary fuel assembly 10 mounted in a schematically depicted nuclear reactor 4 is depicted generally in FIG. 1. The fuel assembly 10 includes a bottom nozzle 12 that supports the fuel assembly 10 on a lower core support plate 14 in the core region of the nuclear reactor 4. The nuclear reactor 4 is a pressurized water reactor that includes a plurality of the fuel assemblies 10 disposed on the core support plate 14. In addition to the bottom nozzle 12, the structural skeleton of the fuel assembly 10 also includes a top nozzle 16 at its upper end and a number of elongated guide tubes or thimble tubes 18 which extend longitudinally between the bottom and top nozzles 12 and 16 and at opposite ends are connected therewith.

The fuel assembly 10 further includes a plurality of transverse grids 20 axially spaced along and mounted to the thimble tubes 18 and an organized array of elongated fuel rods 22 transversely spaced and supported by the grids 20. Also, the exemplary fuel assembly 10 depicted in FIG. 1 includes an instrumentation tube 24 located in the center thereof that extends between the bottom and top nozzles 12 and 16. With such an arrangement of parts, the fuel assembly 10 forms an integral unit capable of being conveniently handled without damaging the assembly parts.

As mentioned above, the fuel rods 22 in the array thereof in the fuel assembly 10 are held in spaced relationship with one another by the grids 20 spaced along the length of the fuel assembly 10. Each fuel rod 22 includes a plurality of nuclear fuel pellets and is closed at its opposite ends by upper and lower end plugs 28 and 30. The fuel pellets are composed of fissile material and are responsible for creating the reactive power of the nuclear reactor 4.

A liquid moderator/coolant such as water, or water containing boron, is pumped upwardly through a plurality of flow openings in the lower core plate 14 to the fuel assembly 10. The bottom nozzle 12 of the fuel assembly 10 passes the coolant flow upwardly through the thimble tubes 18 and along the fuel rods 22 of the assembly in order to extract heat generated therein for the production of useful work.

To control the fission process, a number of control rods 34 are reciprocally movable in the thimble tubes 18 located at predetermined positions in the fuel assembly 10. Specifically, a rod cluster control mechanism 36 positioned above the top nozzle 16 supports the control rods 34. The control mechanism 36 has an internally threaded cylindrical member 37 with a plurality of radially extending arms 38. Each arm 38 is interconnected to a control rod 34 such that the control mechanism 36 is operable to move the control rods 34 vertically in the thimble tubes 18 to thereby control the fission process in the fuel assembly 10, all in a well-known manner.

Figure 2:
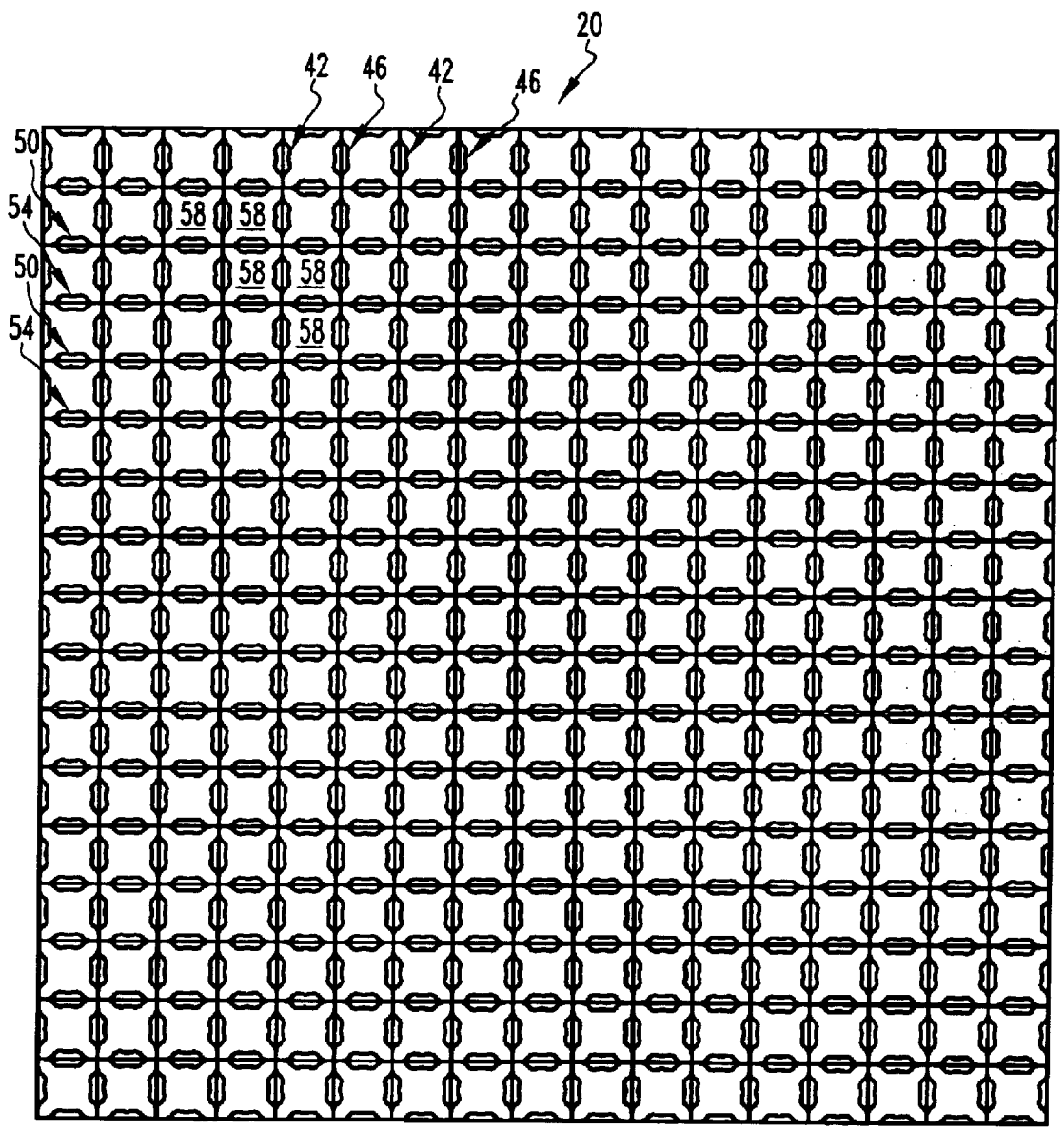
FIG. 2 is a top plan view of a grid in accordance with the present invention.
Figure 5:
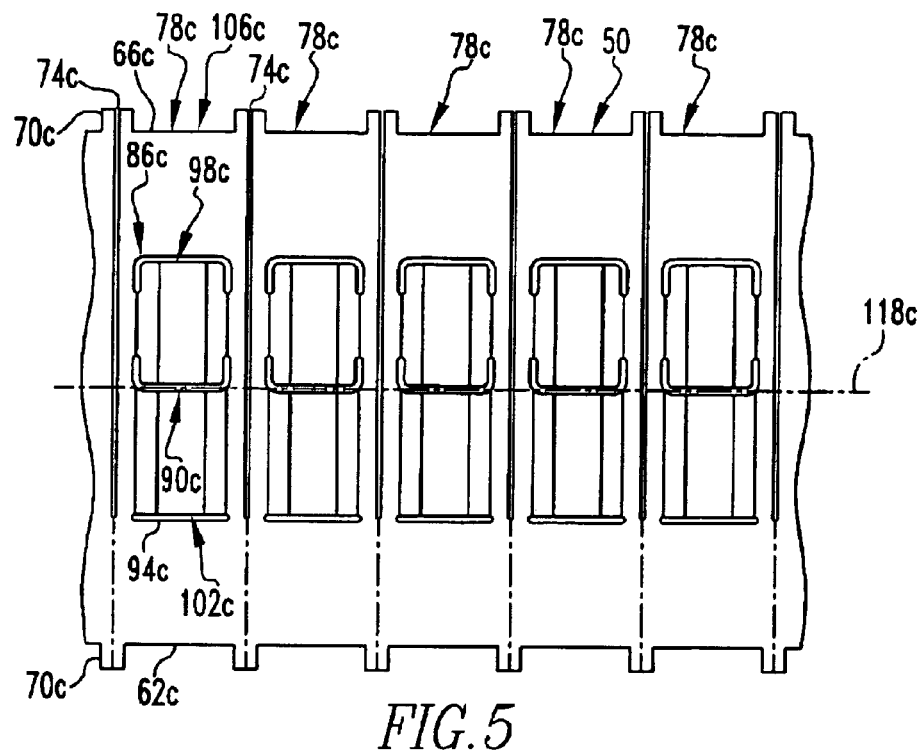
FIG. 5 is a front elevational view of another portion of the grid.
Figure 6:
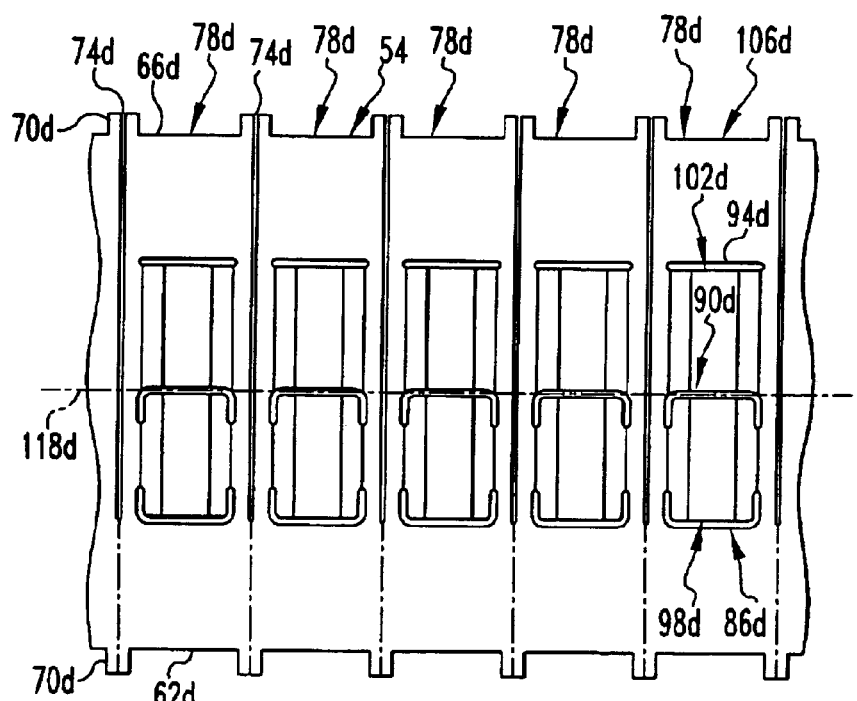
FIG. 6 is a front elevational view of another portion of the grid.

One of the improved grids 20 of the present invention is more particularly depicted in FIG. 2. The grid 20 includes a plurality of first straps 42 (FIG. 3), a plurality of second straps 46 (FIG. 4), a plurality of third straps 50 (FIG. 5), and a plurality of fourth straps 54 (FIG. 6). The first, second, third, and fourth straps 42, 46, 50, and 54 are interleaved with one another in a lattice configuration to define a plurality of roughly square cells 58. Each of the cells 58 is configured to receive therein one of the fuel rods 22 or one of the thimble tubes 18, it being understood that the fuel rods 22 and the thimble tubes 18 are elongated cylindrical members of a generally known configuration.

Figure 3:
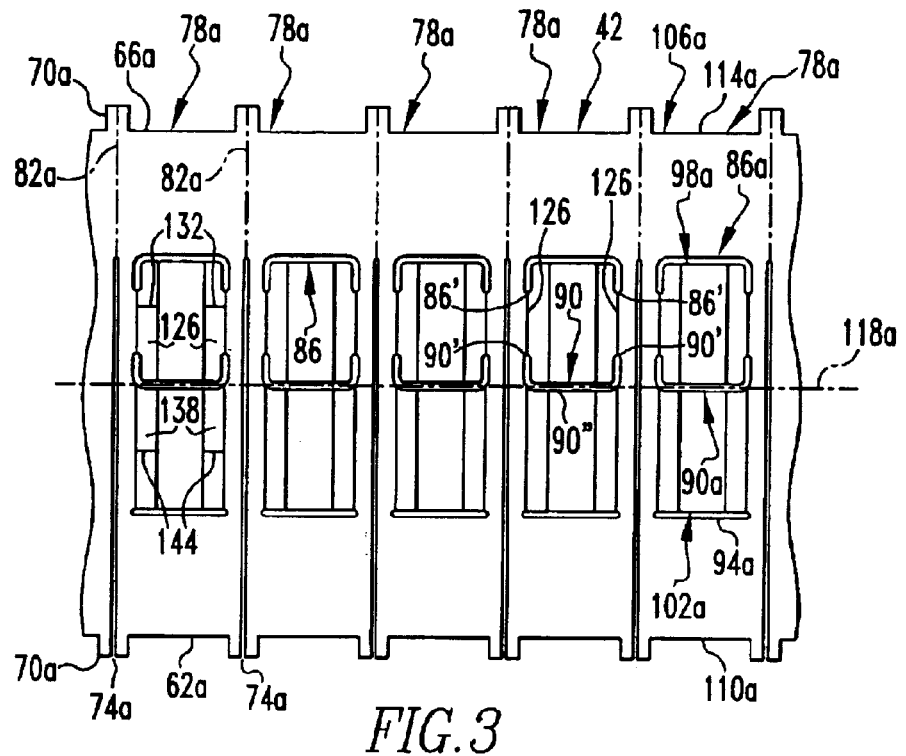
FIG. 3 is a front elevational view of a portion of the grid.

As is best shown in FIG. 3, the first straps 42 are each elongated sheets of a material such as Zircaloy or other appropriate material that is suited to a nuclear environment. The first straps 42 each include an upstream edge 62a and a downstream edge 66a opposite one another. The upstream edge 62a is depicted in FIG. 3 as being at the bottom of the first strap 42, and the downstream edge 66a is depicted as being at the top of the first strap 42. Since the nuclear reactor 4 is a pressurized water reactor, and the coolant in such a reactor 4 flows vertically upward, it can be seen that any coolant flowing vertically upward past the first straps 42 first passes the upstream edge 62a before passing the downstream edge 66a. Accordingly, FIG. 3 generally depicts in an elevational view the first strap 42 as it will appear when employed in the grid 20 installed in the fuel assembly 10 of the reactor 4.

Figure 4:
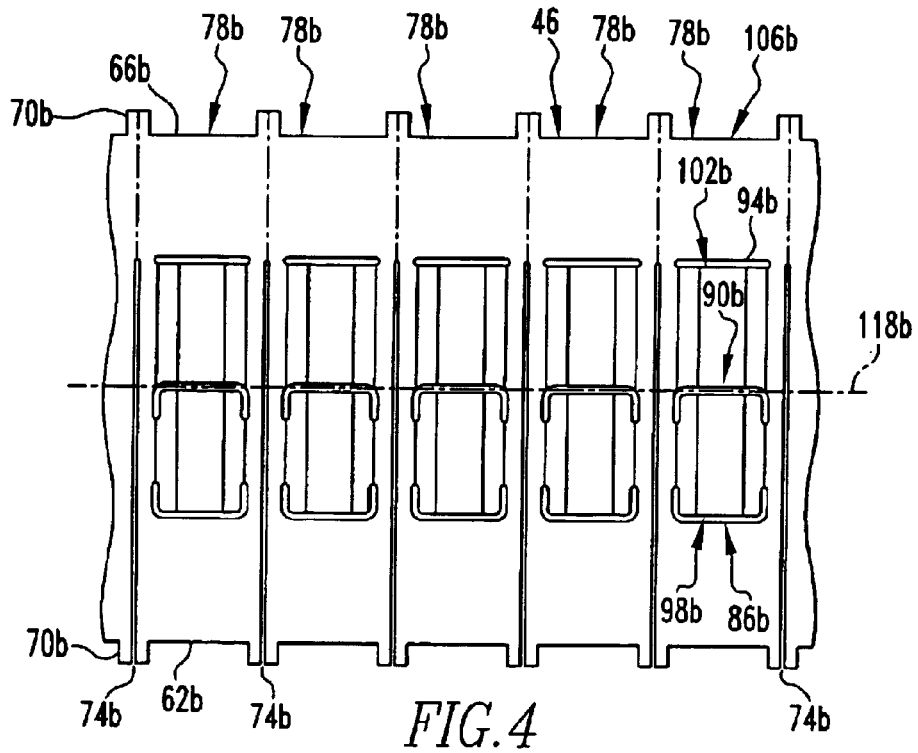
FIG. 4 is a front elevational view of another portion of the grid.

Although they will be described in greater detail below, it can be seen from FIGS. 3 and 6 that the first straps 42 are depicted as being substantially identical to the fourth straps 54, except being vertical mirror images of one another. The same can be said of the second and third straps 46 and 50 (FIGS. 4 and 5.) It is understood, however, that the first, second, third, and fourth straps 42, 46, 50, and 54 likely will be configured to include mixing vanes or other such structures (not shown) extending from the downstream edges 66 thereof. As such, the first, second, third, and fourth straps 42, 46, 50 and 54 likely will be of four different designs although this is not specifically depicted in FIGS. 3–6.

It can be seen from FIG. 3 that the first straps 42 include a plurality of welding tabs 70a spaced from one another and extending along both of the upstream and downstream edges 62a and 66a. Moreover, the first straps 42 are formed with a plurality of parallel and spaced apart slots 74a that are oriented transverse to the longitudinal extent of the first straps 42. It can be seen that the slots 74a extend through the welding tabs 70a at the upstream edge 62a and extend thereafter through the first strap 42 to a point between the upstream and downstream edges 62a and 66a. FIG. 3 additionally depicts an imaginary line 82a extending between the terminus of each slot 72a and the downstream edge 66a.

The slots 74a, along with their associated lines 82a, define a plurality of strap members 78a on the first straps 42. Each strap member 78a is defined as the material disposed between a pair of adjacent slots 74a and their associated lines 82a and extend between the upstream and downstream edges 62a and 66a.

It can be seen that each strap member 78a is formed with a first spring groove 86a, a second spring groove 90a, and a dimple groove 94a. It can be seen that the first and second spring grooves 86a and 90a are generally U-shaped in configuration, while the dimple groove 94a is substantially straight. It can further be seen that the first and second spring grooves 86a and 90a and the dimple groove 94a are all disposed in their entireties between a pair of the slots 74a.

It thus can be understood that each strap member 78a includes a spring 98a, a dimple 102a, and a frame 106a. The spring 98a is defined between the first and second spring grooves 86a and 90a, and the dimple 102a is defined between the second spring groove 90a and the dimple groove 94a. It can be seen that the spring 98a and the dimple 102a both extend from the frame 106a. The frame 106a is defined as including a slotted portion 110a and an unslotted portion 114a, with the slotted portion 110a extending between the dimple groove 94a and the upstream edge 62a between the slots 74a, and the unslotted portion 114a being disposed adjacent the downstream edge 66a and opposite the slotted portion 110a. The frame 106a additionally includes the portions of the strap member 78a extending between each slot 74a and the ends of the first and second spring grooves 86a and 90a and the dimple groove 94a on opposites sides of the strap member 78a.

Each first strap 42 additionally includes a strap axis 118a extending longitudinally thereon and being disposed generally along the portion of the second spring groove 90a that is parallel with the dimple groove 94a. It thus can be seen that the spring 98a and the dimple 102a are disposed on opposite sides of the strap axis 118a. Accordingly, when the first straps 42 are incorporated into the grid 20 and the grid 20 is incorporated into the fuel assembly 10 which is installed in the nuclear reactor 4, the springs 98a will be disposed vertically above the dimples 102a. As will be set forth more fully below, the spring 98a and the dimple 102a are formed to protrude outwardly in opposite directions from the frame 106a.

The spring 98a and the dimple 102a are disposed on alternate sides of the second spring groove 90a. It can also be seen that the second spring groove 90a is disposed generally midway between the upstream and downstream edges 62a and 66a. Since the spring 98a and the dimple 102a can be said to share the second spring groove 90a, the first strap 42 can be formed to have a relatively small height, i.e., transverse distance with respect to the strap axis 118a, which results in a savings of material and reduced pressure drop during operation of the reactor 4.

As can be seen from FIG. 4, the second straps 46 share many similarities with the first straps 42, but nevertheless include some differences. It can be seen that the second straps 46 include a pair of opposite upstream and downstream edges 62b and 66b, as well as a plurality of welding tabs 70b extending from both the upstream and downstream edges 62b and 66b. The slots 74b extend from the upstream edge 62b to define a plurality of strap members 78b. It can be seen that the slots 74b terminate approximately adjacent the dimple grooves 94b, with the first and second spring grooves 86b and 90b being disposed between the dimple groove 94b and the upstream edge 62b. The spring 98b is defined between the first and second spring grooves 86b and 90b, and the dimple 102b is defined between the second spring groove 90b and the dimple groove 94b, it being understood that the spring and dimple 98b and 102b extend from the frame 106b.

The second straps 46 additionally each include a strap axis 118b extending through the portion of the second spring groove 90b that is parallel with the dimple groove 94b. In the case of the second straps 46, however, the dimples 102b are disposed vertically above the springs 98b, and the dimples 102b and the springs 98b will share such relative orientation when the second straps 46 are installed into the grid 20 which is disposed within the reactor 4.

As can be seen from FIG. 5, the third straps 50 share many similarities with the first straps 42, but nevertheless include some differences. It can be seen that the third straps 50 include a pair of opposite upstream and downstream edges 62c and 66c, as well as a plurality of welding tabs 70c extending from both the upstream and downstream edges 62c and 66c. The slots 74c extend from the downstream edge 66c to define a plurality of strap members 78c. It can be seen that the slots 74c terminate approximately adjacent the dimple grooves 94c, with the first and second spring grooves 86c and 90c being disposed between the dimple groove 94c and the downstream edge 66c. The spring 98c is defined between the first and second spring grooves 86c and 90c, and the dimple 102c is defined between the second spring groove 90c and the dimple groove 94c, it being understood that the spring and dimple 98c and 102c extend from the frame 106c.

The third straps 50 additionally each include a strap axis 118c extending through the portion of the second spring groove 90c that is parallel with the dimple groove 94c. In the case of the third straps 50, the dimples 102c are disposed vertically below the springs 98c.

As can be seen from FIG. 6, the fourth straps 54 share many similarities with the first straps 42, but nevertheless include some differences. It can be seen that the fourth straps 54 include a pair of opposite upstream and downstream edges 62d and 66d, as well as a plurality of welding tabs 70d extending from both the upstream and downstream edges 62d and 66d. The slots 74d extend from the downstream edge 66d to define a plurality of strap members 78d. It can be seen that the slots 74d terminate approximately adjacent the first spring grooves 86d, with the first and second spring grooves 86d and 90d being disposed between the dimple groove 94d and the upstream edge 62d. The spring 98d is defined between the first and second spring grooves 86d and 90d, and the dimple 102d is defined between the second spring groove 90d and the dimple groove 94d, it being understood that the spring and dimple 98d and 102d extend from the frame 106d.

The fourth straps 54 additionally each include a strap axis 118d extending through the portion of the second spring groove 90d that is parallel with the dimple groove 94d. In the case of the fourth straps 54, the dimples 102d are disposed vertically above the springs 98d.

Figure 7:
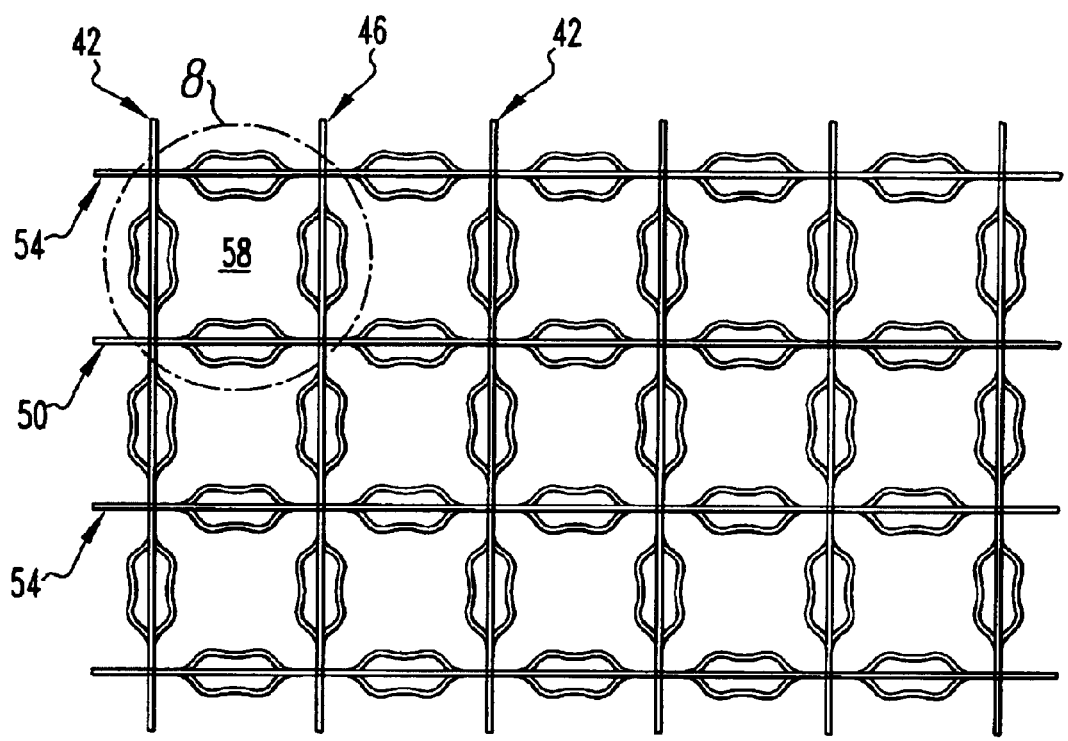
FIG. 7 is an enlarged view of a portion of FIG. 2.

As is best understood from FIG. 7, the first and second straps 42 and 46 are oriented parallel with one another and alternate with one another on the grid 20. Similarly, the third and fourth straps 50 and 54 are oriented parallel with one another and alternate with one another on the grid 20. Additionally, the first and second straps 42 and 46 are oriented substantially perpendicular to the third and fourth straps 50 and 54. It can be understood that with the first, second, third, and fourth straps 42, 46, 50, and 54 arranged as such, the strap axes 118 together define an imaginary grid plane 182 (FIGS. 9 and 10) that extends through the indicated portions of the second spring grooves 90 and is oriented generally parallel with the plane of the page of FIG. 2. It is to be understood from the foregoing passage that the terminology "strap axes 118" refers collectively to the strap axes 118a, 118b, 118c, and 118d, and that the terminology "second spring grooves 90" refers collectively to the second spring grooves 90a, 90b, 90c, and 90d, and similar collective language is used elsewhere herein.

Figures 9, 10:
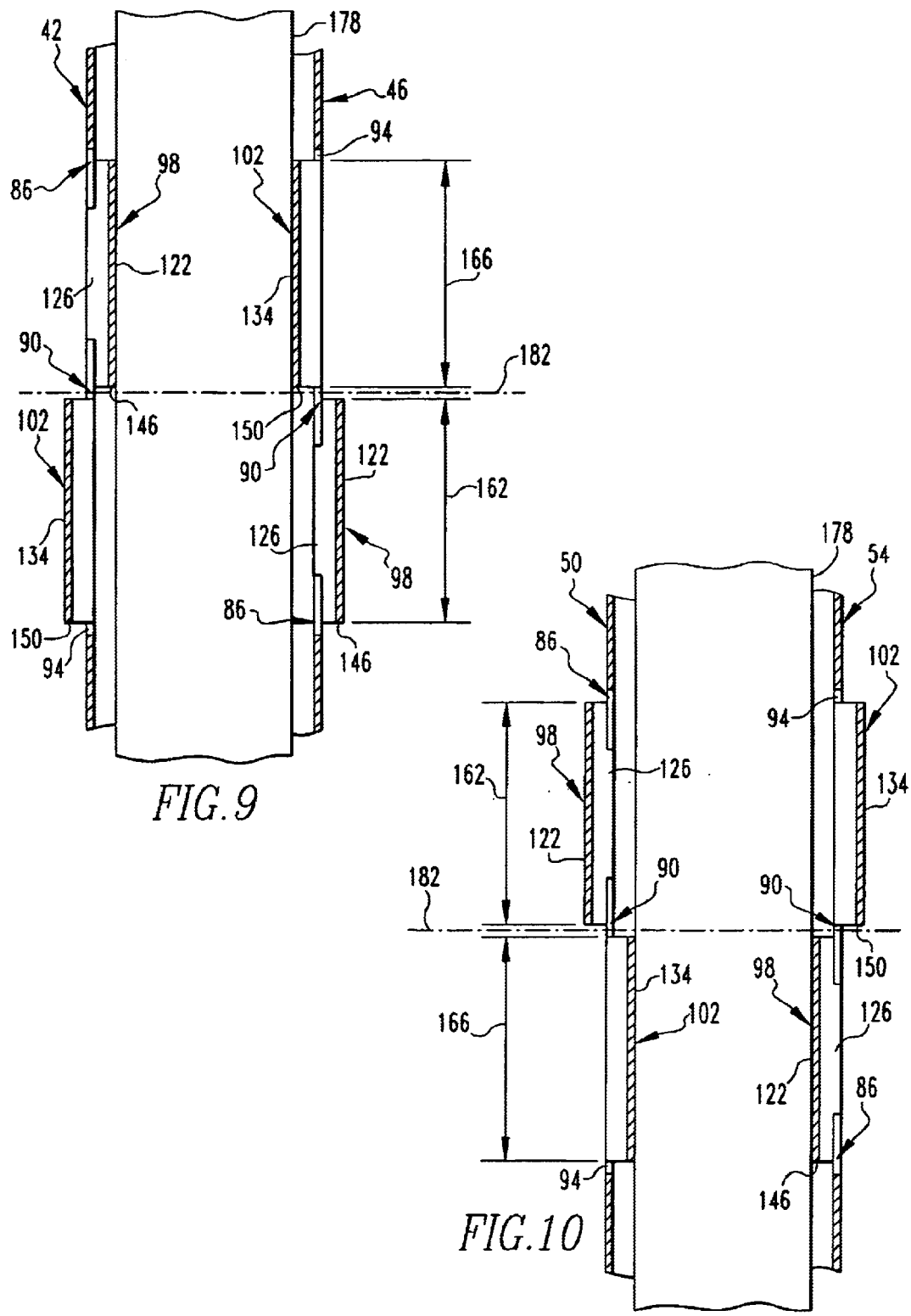
FIG. 9 is a sectional view as taken along line 9—9 of FIG. 8.
FIG. 10 is a sectional view as taken along line 10—10 of FIG. 8.

As can best be seen in FIGS. 9 and 10, the springs 98 and the dimples 102 protrude from the frames 106 in opposite directions therefrom. In the exemplary first strap 42 of FIG. 3, all of the springs 98a thereof protrude in the same direction, and all of the dimples 102a thereof protrude in the same opposite direction. It is understood that in other configurations (not shown) of the grid 20, the springs 98a of different strap members 78a may protrude in opposite directions from the frames 106a, it being understood, however, that as a general rule the dimple 102a of any particular strap member 78a will protrude in an opposite direction from the respective spring 98a.

Figure 8:
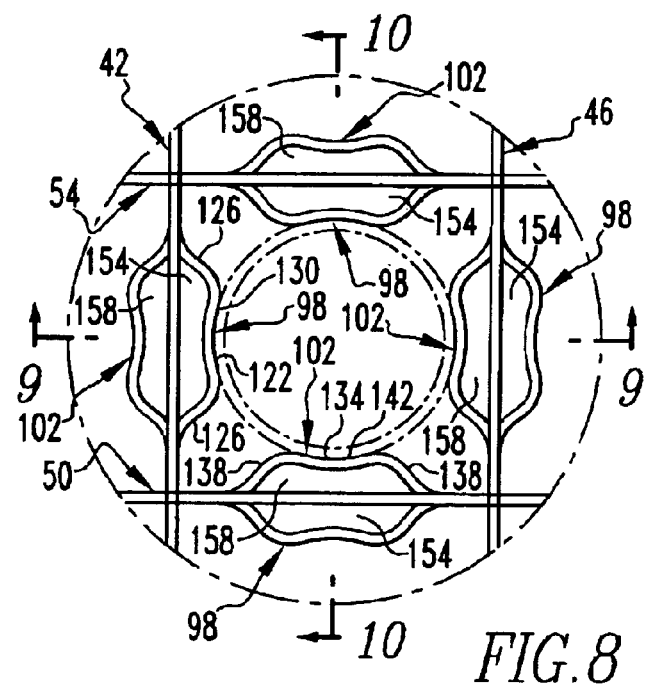
FIG. 8 is an enlarged view of a portion of FIG. 7 and additionally depicts a cylindrical member in phantom lines.

As is best understood from FIGS. 7 and 8, each spring 98 is formed to include a spring plate 122 and a pair of spring ligaments 126. The spring plate 122 is formed to include an arcuate spring contour 130 that is shaped to correspond with and engage an outer surface of one of the cylindrical members, i.e., either one of the thimble tubes 18 or one of the fuel rods 22.

The spring ligaments 126 extend from opposite sides of the spring plate 122 to the frame 106. Each spring ligament 126 includes a spring ligament axis 132 (FIG. 3) extending longitudinally thereon, and it can be seen that the spring ligament axes 132 are oriented generally parallel with the grid plane 182.

The dimples 102 are similarly configured in that they include a dimple plate 134 and a pair of dimple ligaments 138, with the dimple plate being formed to include an arcuate dimple contour 142, and with the dimple ligaments 138 extending from opposite sides of the dimple plate 134 to the frame 106. The dimple contour 142 is generally arcuate and is configured to correspond with and engage one of the cylindrical members, i.e., either one of the thimble tubes 18 or one of the fuel rods 22. Each dimple ligament 138 includes a dimple ligament axis 144 (FIG. 3) extending longitudinally thereon, and it can be seen that the dimple ligament axes 144 are oriented generally parallel with the grid plane 182 and with the spring ligament axis 132.

The engagement of the spring contours 130 and the dimple contours 142 with the cylindrical members may subtend an arc in the range of about 15 degrees to 25 degrees along the cylindrical member.

As can be understood from FIG. 8, each of the cells 58 is generally defined by four interconnected strap members 78. More particularly, two of the springs 98 and two of the dimples 102 protrude into each cell 58. One of the springs 98 and one of the dimples 102 cooperate together as a pair of directly confronting support features to support the cylindrical member in a given direction. As used herein, the expressions "directly confronting," "confronting," and variations thereof shall refer to a condition in which structures operate or exist in opposite directions, and are at substantially the same elevation.

Accordingly, it can be seen from FIG. 9 that the indicated spring 98 and dimple 102 that are engaged with the cylindrical member 178 are disposed at the same longitudinal position along the cylindrical member 178 and are disposed on opposite sides of the cylindrical member 178 at the same vertical position, i.e., height, with respect to the grid plane 182. The aforementioned spring 98 and dimple 102 thus together provide a pair of confronting support features that support the cylindrical member 178 in a plane that is generally parallel with the plane of the page of FIG. 9.

The same can be said of the spring 98 and the dimple 102 of FIG. 10. It can be seen, however, that the spring 98 and the dimple 102 of FIG. 10 are disposed below the grid plane 182 defined by the strap axes 118, whereas the spring 98 and dimple 102 depicted in FIG. 9 are disposed vertically above the grid plane 182. Depending upon the configuration of the specific grid 20, however, the two pairs of support features within any given cell 58 may all be disposed above or below the grid plane without departing from the concept of the present invention.

The springs 98 and the dimples 102 are both compliant, whereby the cylindrical member 178 is interposed between each pair of support features for retention in a given plane. It is understood, however, that the springs 98 are more compliant than the dimples 102. In this regard, it can be seen from FIGS. 3–6 that the generally U-shaped first and second spring grooves 86 and 90 result in the spring ligaments 126 being relatively smaller than the dimple ligaments 138. Specifically, it can be seen in FIG. 3 that the spring ligaments 126 each extend between the facing terminal ends 86' and 90' of the first and second spring grooves 86 and 90, whereas the dimple ligaments 138 extend fully between the dimple groove 94 and the parallel portion 90" of the second spring groove 90. Since the spring ligaments 126 are relatively smaller than the dimple ligaments 138 and further have a relatively smaller area of contact with the frame 106, the springs 98 are more compliant than the dimples 102.

It can be seen that the slots 74 are disposed adjacent the spring ligaments 126 and the dimple ligaments 138 and extend substantially along the entire lengths of the spring ligaments 126 and the dimple ligaments 138. The slots 74, by being disposed adjacent the spring ligaments 126 and the dimple ligaments 138 in substantially their entireties, enhance the compliance of the springs 98 and dimples 102, which resultingly enhances the flexibility with which the springs 98 and dimples 102 can be configured to engage the cylindrical members 178. While it is understood that the slots 74a and 74b of the first and second straps 42 and 46 are engaged in the slots 74c and 74d of the third and fourth straps 50 and 54 in assembling the grid 20, and that the corresponding welding tabs 70 are then welded to one another and fixed in place, the slots 74 are deeper than needed for such engagement for the purpose of providing additional compliance.

The slots 74 additionally are wider than the thickness of the first, second, third, and fourth straps 42, 46, 50, and 54 in order to accommodate some of the growth thereof that normally occurs in a nuclear environment. The relatively wider configuration of the slots 74 therefore contributes to the dimensional stability of the grid 20 in use since growth of components of the grid 20 can, to a certain degree, be absorbed by the relatively wide slots 74.

As can be seen in FIGS. 9 and 10, the spring plates 122 are all of a spring height indicated by the line 162, and dimple plates 134 are all of a dimple height indicated by the line 166. It can be seen that the spring height 162 is substantially equal to the dimple height 166. Similarly, as can be seen from FIG. 8, the spring plates 122 are of a spring contact length indicated by the spring contour 130, and the dimple plates 134 are of a dimple contact length indicated by the dimple contour 142. The spring contact length and the dimple contact length are substantially equal. Such identity between the spring contact length and the dimple contact length come at least in part from the widths of the spring plates 122 and the dimple plates 134 which are substantially equal in the depicted embodiment.

As such, the springs 98 and dimples 102 have substantially the same area of surface contact with the cylindrical members 178, and such surface area of contact is relatively large when compared with previously known grid designs. Moreover, the relatively large spring height 162 and dimple height 166 resists the cylindrical member from vibrating during operation of the reactor 4.

It can be understood that the coolant flowing through the reactor 4 and into contact with the fuel rods 22 flows generally in a direction parallel with the fuel rods 22. It can be understood from FIG. 8 that the spring ligaments 126 extend from the spring plate 122 to the frame 106 in a direction that is substantially perpendicular to the flow of coolant through the reactor 4. Similarly, the dimple ligaments 138 each extend from the dimple plate 134 to the frame 106 in a direction substantially perpendicular to the flow of coolant through the reactor 4. As such, the spring ligaments 126 and the dimple ligaments 138 do not interfere with the flow of coolant through the reactor 4 generally other than providing a spring leading edge 146 (FIGS. 9 and 10) and dimple leading edge 150 which at most only causes a nominal pressure drop. Indeed, it can be seen from FIG. 8 that the spring 98 is configured to provide a spring flow channel 154 between the spring 98 and the frame 106. Similarly, the dimples 102 are configured to provide a dimple flow channel 158 between the dimple 102 and the frame 106. In this regard, it can be seen that the spring ligaments 126 and the dimple ligaments 138 each extend in a direction generally parallel with the grid plane 182 and thus result in a substantially reduced pressure drop than would be the case if the spring ligaments 126 and dimple ligaments 138 extended in a direction generally perpendicular or oblique to the grid plane 182. Such reduced pressure drop results in correspondingly enhanced thermal-hydraulic performance for the reactor 4.

It can be understood that by configuring each strap member 78 to include only a single spring 98 and only a single dimple 102, the support features of each strap member 78 resultingly provide substantially only a single spring leading edge 146 and a single dimple leading edge 150 to cause a pressure drop within the reactor 4. Moreover, by providing only a single dimple 102 for each strap member 78, there is no need to test for coplanarity of pairs of dimples within each strap member, as is needed with previously known strap members that provide pairs of cooperative dimples, since each strap member 78 of the present invention includes only a single dimple 102. Such reduced effort correspondingly reduces the cost of the grid 20. Additionally, since the spring 98 and the dimple 102 of any given strap member 78 are disposed vertically adjacent one another, and advantageously do not include any portion of the frame 106 therebetween, the first, second, third, and fourth straps 42, 46, 50, and 54 can be configured to be relatively narrower than previously known straps of previously known grids, and such reduced material usage further results in the grid 20 being less costly to manufacture.

By configuring the spring plate 122 to include the spring contour 130 and by configuring the dimple plate 134 to include the dimple contour 142, the springs 98 and the dimples 102 can be engaged with the fuel rods 20 along a relatively large surface area. As is understood in the relevant art, since the springs 98 and dimples 102 engage the fuel rods 22, stress therebetween may result in the fretting away of the material of the cladding of the fuel rods 22 until a sufficient area of contact exists between the fuel rods 22 and the springs 98 and dimples 102 that no further fretting occurs. By configuring the springs 98 and the dimples 102 to include the spring contours 130 and the dimple contours 142, any such fretting is arrested relatively quickly since the springs 98 and the dimples 102 are already configured to substantially conform with and correspond with the outer surface of the fuel rods 22. The conformal nature of the springs 98 and the dimples 102 thus reduces the degree of fretting of the fuel rods 22 which correspondingly reduces the effects of flow-induced vibration on the fuel rods 22.

It thus can be seen that the improved grid 20 of the present invention has improved thermal-hydraulic performance, promotes dimensional stability of the fuel assembly 10, results in reduced fretting of the fuel rods 22, and can be fabricated at a relatively lower cost when compared with previously known grids. It is correspondingly understood that the fuel assembly 10 into which the grid 20 is incorporated possesses similar features and thus achieves similar benefits.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A grid for use in a fuel assembly of a nuclear reactor, the grid being structured to carry a plurality of cylindrical members including at least one of a fuel rod and a thimble tube, the grid comprising:

a plurality of straps;

the straps being interconnected with one another in a lattice fashion to define a plurality of cells;

each strap including an upstream edge;

each strap including a downstream edge;

the upstream edge and the downstream edge being disposed generally opposite one another;

each strap including a plurality of strap members;

each strap member defining a wall of at least one of the cells;

each strap member including a protruding resilient holding spring;

each strap member including a protruding dimple;

the spring and the dimple being disposed at alternate sides of at least a portion of a single groove formed in the associated strap member;

a pair of the springs and a pair of the dimples extending into each of the cells;

one of the springs of the pair of springs and one of the dimples of the pair of dimples confronting one another; and the other of the springs of the pair of springs and the other of the dimples of the pair of dimples confronting one another.

2. The grid as set forth in claim 1, in which each spring includes a pair of spring ligaments;

in which each dimple includes a pair of dimple ligaments; and in which the spring ligaments are generally more compliant than the dimple ligaments.

3. The grid as set forth in claim 2, in which the spring ligaments are smaller than the dimple ligaments.

4. The grid as set forth in claim 1, in which each strap member includes a frame;

the spring and dimple protruding from the frame;

each spring including a spring plate and a spring ligament, the spring ligament extending between the frame and the spring plate;

each dimple including a dimple plate and a dimple ligament, the dimple ligament extending between the frame and the dimple plate; and in which each strap includes a strap axis;

the strap axes of substantially all of the straps lying generally within an imaginary grid plane;

in which each spring ligament includes a spring ligament axis extending between the frame and the spring plate; and in which each dimple ligament includes a dimple ligament axis extending between the frame and the dimple plate;

the spring ligament axes and the dimple ligament axes all being oriented generally parallel with the grid plane.

5. The grid as set forth in claim 1, in which each strap includes a strap axis;

the strap axes together lying generally within an imaginary grid plane;

in which the plurality of straps includes a plurality of first straps, a plurality of second straps, a plurality of third straps, and a plurality of fourth straps;

the first straps and the second straps being oriented substantially parallel with one another and being disposed alternately with one another on the grid;

the third straps and the fourth straps being oriented substantially parallel with one another and being disposed alternately with one another on the grid;

the first straps and the second straps being disposed substantially perpendicular to the third straps and the fourth straps;

in which the springs of the first straps and the third straps are disposed above the grid plane;

in which the springs of the second straps and the fourth straps are disposed below the grid plane;

in which the dimples of the first straps and the third straps are disposed below the grid plane; and in which the dimples of the second straps and the fourth straps are disposed above the grid plane.

6. The grid as set forth in claim 1, in which the spring includes a spring plate formed to include a concave spring contour; and in which the dimple includes a dimple plate formed to include a concave dimple contour;

the spring contour and the dimple contour each being structured to substantially correspond with and engage at least a portion of an outer surface of an associated cylindrical member.

7. The grid as set forth in claim 1, in which the one of the pair of the springs and the one of the pair of the dimples are both of substantially the same height and width.

8. A grid for use in a fuel assembly of a nuclear reactor, the grid being structured to carry a plurality of cylindrical members including at least one of a fuel rod and a thimble tube, the grid comprising:

a plurality of straps;

the straps being interconnected with one another in a lattice fashion to define a plurality of cells;

each strap including an upstream edge;

each strap including a downstream edge;

the upstream edge and the downstream edge being disposed generally opposite one another;

each strap including a plurality of strap members;

each strap member defining a wall of at least one of the cells;

each strap member including a groove formed therein;

each strap member including a protruding resilient holding spring;

each strap member including a protruding dimple;

the spring and dimple each being formed at least partially by the groove;

at least a portion of one of the spring and the dimple being disposed between the groove and the upstream edge;

at least a portion of the other of the spring and the dimple being disposed between the groove and the downstream edge;

a pair of the springs and a pair of the dimples extending into each of the cells;

one of the springs of the pair of springs and one of the dimples of the pair of dimples confronting one another; and the other of the springs of the pair of springs and the other of the dimples of the pair of dimples confronting one another.

9. The grid as set forth in claim 8, in which at least a portion of the groove is oriented generally parallel with the upstream and downstream edges.

10. The grid as set forth in claim 9, in which the at least portion of the groove is disposed generally midway between the upstream and downstream edges.

11. A grid for use in a fuel assembly of a nuclear reactor, the grid being structured to carry a plurality of cylindrical members including at least one of a fuel rod and a thimble tube, the grid comprising:

a plurality of straps; the straps being interconnected with one another in a lattice fashion to define a plurality of cells;

at least a portion of the plurality of straps each including an upstream edge and a downstream edge disposed opposite one another;

at least a portion of the plurality of straps each including a plurality of strap members;

at least a portion of the plurality of strap members each being a wall of at least one of the cells;

at least a portion of the plurality of strap members each including a protruding resilient holding spring and a protruding dimple disposed at alternate sides of at least a portion of a single groove formed in the strap member.

12. The grid of claim 11 wherein at least a portion of the plurality of cells each has a pair of the springs and a pair of the dimples protruding therein, one spring of the pair of springs and one dimple of the pair of dimples confronting one another, the other spring of the pair of springs and the other dimple of the pair of dimples confronting one another.

13. The grid of claim 11 wherein the spring and the dimple are of unequal compliance.

* * * * *